(12) United States Patent
van Hassel

(10) Patent No.: US 11,255,026 B2
(45) Date of Patent: Feb. 22, 2022

(54) METHOD FOR ELECTROSPINNING OF AN ULTRA-HIGH TEMPERATURE COMPOSITE STRUCTURE

(71) Applicant: United Technologies Corporation, Farmington, CT (US)

(72) Inventor: Bart A. van Hassel, Weatogue, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 265 days.

(21) Appl. No.: 16/415,466

(22) Filed: May 17, 2019

(65) Prior Publication Data

US 2020/0362472 A1 Nov. 19, 2020

(51) Int. Cl.
*D01D 10/02* (2006.01)
*D01F 9/08* (2006.01)
(Continued)

(52) U.S. Cl.
CPC ..... *D01D 5/0061* (2013.01); *C04B 35/62227* (2013.01); *C04B 35/62272* (2013.01); *C04B 35/62277* (2013.01); *C04B 35/62281* (2013.01); *C04B 37/001* (2013.01); *C04B 41/0036* (2013.01); *D01D 5/003* (2013.01); *D01D 5/0023* (2013.01); *D01D 5/0038* (2013.01);
(Continued)

(58) Field of Classification Search
CPC ........ C04B 35/62227; C04B 35/62272; C04B 35/62277; C04B 35/62281; C04B 37/001; C04B 41/00; C04B 41/0036; C04B 41/80; C04B 2235/3804; C04B 2235/3813; C04B 2235/3817; C04B 2235/3826; C04B 2235/3839; C04B 2237/36; C04B 2237/365; C04B 2237/50; D01D 5/0023; D01D 5/003; D01D 5/0038; D01D 5/0092; D01D 10/02; D01F 9/08; D02J 13/00; D06M 10/005; D06M 10/006
USPC .... 264/171.1, 234, 430, 433, 434, 464, 465, 264/466, 482, 484, 485, 639, 642
See application file for complete search history.

(56) References Cited

U.S. PATENT DOCUMENTS

| 9,951,444 B2 | 4/2018 | Dzenis |
| 10,029,029 B2 | 7/2018 | McClellan et al. |

(Continued)

FOREIGN PATENT DOCUMENTS

| CN | 104762696 B | 8/2016 |
| WO | 2017148460 A2 | 9/2017 |
| WO | 20170148460 W | 9/2017 |

OTHER PUBLICATIONS

EP search report for EP20173011.6 dated Jan. 21, 2021.
(Continued)

*Primary Examiner* — Leo B Tentoni
(74) *Attorney, Agent, or Firm* — Getz Balich LLC

(57) ABSTRACT

A method for forming an ultra-high temperature (UHT) composite structure includes dispensing a polymeric precursor with a spinneret biased at a first DC voltage; forming a plurality of nanofibers from the polymeric precursor; receiving the plurality of nanofibers with a collector biased at a second DC voltage different than the first DC voltage; and changing a direction of movement of the plurality of nanofibers between the spinneret and the collector with a plurality of magnets having a magnetic field by adjusting the magnetic field.

9 Claims, 4 Drawing Sheets

(51) Int. Cl.
*D02J 13/00* (2006.01)
*C04B 41/00* (2006.01)
*C04B 41/80* (2006.01)
*D01D 5/00* (2006.01)
*D01F 9/10* (2006.01)
*D06M 10/00* (2006.01)
*C04B 37/00* (2006.01)
*C04B 35/622* (2006.01)

(52) U.S. Cl.
CPC .............. *D01D 5/0092* (2013.01); *D01F 9/10* (2013.01); *D06M 10/005* (2013.01); *D06M 10/006* (2013.01); *C04B 2235/3804* (2013.01); *C04B 2235/3813* (2013.01); *C04B 2235/3817* (2013.01); *C04B 2235/3826* (2013.01); *C04B 2235/3839* (2013.01); *C04B 2237/36* (2013.01); *C04B 2237/365* (2013.01); *C04B 2237/50* (2013.01)

(56) References Cited

U.S. PATENT DOCUMENTS

| | | | |
|---|---|---|---|
| 2009/0152773 | A1 | 6/2009 | Barinov |
| 2011/0012296 | A1 | 1/2011 | Nakanichi |
| 2011/0018174 | A1* | 1/2011 | Baca .................... D01D 5/0092 264/465 |
| 2015/0224739 | A1* | 8/2015 | Joo ........................... B32B 5/12 264/465 X |
| 2017/0203484 | A1 | 7/2017 | Grigoryev et al. |

OTHER PUBLICATIONS

EP partial search report for EP20173011.6 dated Oct. 6, 2020.
Teo et al. "A review on electrospinning design and nanofibre assemblies", Nanotechnology 17, 2006, p. R89-R106.
Azamoush et al. "Additive Manufacturing of SiCN Ceramic Matrix for SiC Fiber Composites by Flash Pyrolysis of Nanoscale Polymer Films", J. Am. Cem, Soc, 99 (6), 2016, pp. 1855-1858.
Huang et al. "A review on polymer nanofibers by electrospinning and their applications in nanocomposites", Composites Science and Technology 63, 2003, pp. 2223-2253.
Rahmani et al. "Statistical Analysis of Nanofibers Alignment in Magnetic-Field-Assisted Electrospinning Including an Alignment Percentage Formula", Journal of Applied Polymer Science, Jun. 16, 2014.
Tao et al. "Synthesis and Characterization of a Boron-Containing Precursor for ZrB2 Ceramic", Journal of Ceramic Science and Technology 07, 2006, pp. 107-112.
Soldate et al. "Controlled Deposition of Electrospun Nanofibers by Electrohydrodynamic Deflection", Journal of Applied Physics 125, 2019.
Gevorkyan et al. "Rapid Thermal Processing of Electrospun PbZr0.52Ti0.4803 Nanofibers", Thermochimica Acta 605, 2015, pp. 107-114.

* cited by examiner

METHOD FOR ELECTROSPINNING OF AN ULTRA-HIGH TEMPERATURE COMPOSITE STRUCTURE

BACKGROUND

1. Technical Field

This disclosure relates generally to systems and methods for forming ultra-high temperature (UHT) ceramic matrix composite (CMC) structures, and more particularly to electrospinning systems and methods for forming ultra-high temperature (UHT) ceramic matrix composite (CMC) structures.

2. Background Information

Hypersonic vehicles and reusable space systems may require materials which can withstand extreme conditions (e.g., high temperatures and pressures) for a relatively short period of time. Ceramic matrix composites can withstand higher temperatures than metals and, therefore, require less cooling than conventional materials from which aerospace components are manufactured. However, manufacturing composite components capable of withstanding said extreme conditions is difficult. For example, convention manufacturing methods may be unable to obtain sufficient density of the composite material in a complex shape. Accordingly, improved systems and methods for manufacturing composite structures suitable for extreme conditions are necessary.

SUMMARY

According to an embodiment of the present disclosure, an electrospinning system includes a first spinneret disposed at a first end of a flowpath and biased at a first DC voltage. The first spinneret is configured to dispense a first polymeric precursor into the flowpath forming a first plurality of nanofibers. A collector is disposed at a second end of the flowpath and spaced from the first spinneret along the flowpath. The collector is biased at a second DC voltage different than the first DC voltage and is configured to receive the first plurality of nanofibers. A plurality of magnets having a magnetic field are disposed about the flowpath between the first spinneret and the collector. The plurality of magnets is configured to adjust the magnetic field so as to change a direction of movement of the first plurality of nanofibers along the flowpath between the first spinneret and the collector.

In the alternative or additionally thereto, in the foregoing embodiment, each magnet of the plurality of magnets is an electromagnet.

In the alternative or additionally thereto, in the foregoing embodiment, the first polymeric precursor includes at least one of polyacrylonitrile resin, phenolic resin, polyvinylpyrrolidone, polyamide, poly(lactic-co-glycolic) acid, polycaprolactone, polypropylene, polivinylalcohol, or nylon-6.

In the alternative or additionally thereto, in the foregoing embodiment, the system further includes a second spinneret biased at the first DC voltage. The second spinneret is configured to dispense a second polymeric precursor into the flowpath forming a second plurality of nanofibers. The collector is configured to receive the second plurality of nanofibers.

In the alternative or additionally thereto, in the foregoing embodiment, the second polymeric precursor is different than the first polymeric precursor.

In the alternative or additionally thereto, in the foregoing embodiment, the first spinneret is configured to coaxially dispense the first polymeric precursor and a second polymeric precursor different than the first polymeric precursor.

In the alternative or additionally thereto, in the foregoing embodiment, the system further includes a rapid thermal processing assembly.

In the alternative or additionally thereto, in the foregoing embodiment, the rapid thermal processing assembly includes at least one of a laser, an electron beam, or a flash pyrolysis assembly.

In the alternative or additionally thereto, in the foregoing embodiment, the first spinneret and the collector are configured to move relative to one another.

According to another embodiment of the present disclosure, a method for forming an ultra-high temperature (UHT) composite structure is provided. A polymeric precursor is dispensed with a spinneret biased at a first DC voltage. A plurality of nanofibers is formed from the polymeric precursor. The plurality of nanofibers is received with a collector biased at a second DC voltage different than the first DC voltage. A direction of movement of the plurality of nanofibers between the spinneret and the collector is changed with a plurality of magnets having a magnetic field by adjusting the magnetic field.

In the alternative or additionally thereto, in the foregoing embodiment, each magnet of the plurality of magnets is an electromagnet.

In the alternative or additionally thereto, in the foregoing embodiment, the method further includes pyrolyzing the plurality of nanofibers disposed on the collector.

In the alternative or additionally thereto, in the foregoing embodiment, the method further includes one of carbothermally or borothermally reducing the plurality of nanofibers.

In the alternative or additionally thereto, in the foregoing embodiment, the method further includes pyrolyzing the plurality of nanofibers disposed on the collector with a rapid thermal processing assembly.

In the alternative or additionally thereto, in the foregoing embodiment, the rapid thermal processing assembly includes at least one of a laser, an electron beam, or a flash pyrolysis assembly.

In the alternative or additionally thereto, in the foregoing embodiment, pyrolyzing the plurality of nanofibers includes applying a thermal energy to a first layer of the plurality of nanofibers deposited on the collector.

In the alternative or additionally thereto, in the foregoing embodiment, the method further includes receiving a second layer of the plurality of nanofibers with the collector subsequent to applying the thermal energy to the first layer of the plurality of nanofibers.

According to another embodiment of the present disclosure, a method for forming an ultra-high temperature (UHT) composite structure is provided. A polymeric precursor is dispensed with a spinneret biased at a first DC voltage. A plurality of nanofibers is formed from the polymeric precursor. The plurality of nanofibers is received with a collector biased at a second DC voltage different than the first DC voltage. The first layer of the plurality of nanofibers deposited on the collector is pyrolyzed with a rapid thermal processing assembly by applying a thermal energy to the first layer of the plurality of nanofibers. The first layer of the plurality of nanofibers deposited on the collector is carbothermally or borothermally reduced.

In the alternative or additionally thereto, in the foregoing embodiment, a direction of movement of the plurality of nanofibers between the spinneret and the collector is changed with a plurality of magnets.

In the alternative or additionally thereto, in the foregoing embodiment, the method receiving a second layer of the plurality of nanofibers with the collector subsequent to pyrolyzing the first layer of the plurality of nanofibers.

The present disclosure, and all its aspects, embodiments and advantages associated therewith will become more readily apparent in view of the detailed description provided below, including the accompanying drawings.

DETAILED DESCRIPTION

Figure 1:
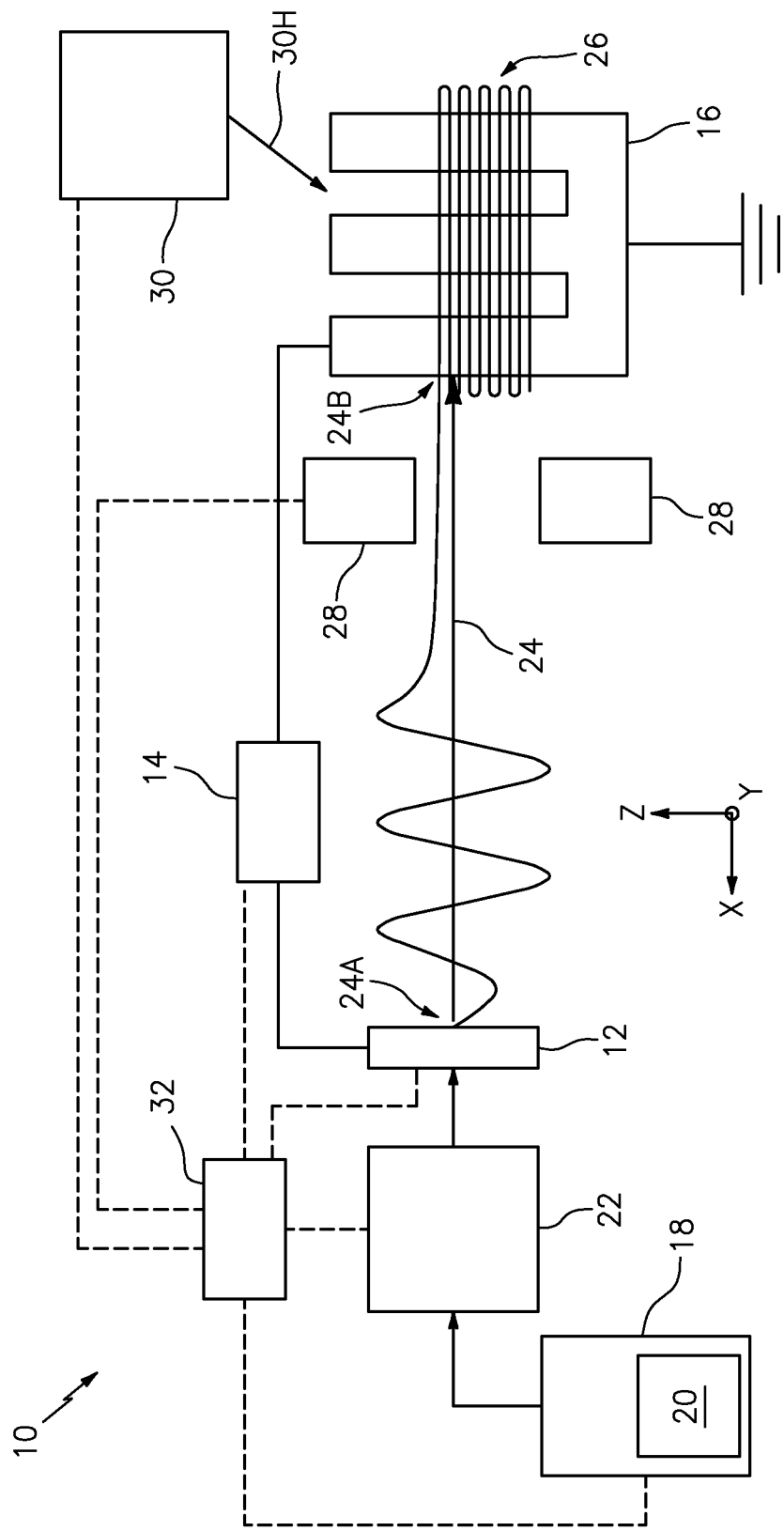
FIG. 1 illustrates an exemplary embodiment of an electrospinning apparatus.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIG. 1, an electrospinning system 10 for forming a three-dimensional ceramic-matrix composite structure, according to at least one embodiment of the present disclosure, is generally illustrated. In some embodiments, the composite structure may include an ultra-high temperature (UHT) ceramic material. The electrospinning system 10 generally includes at least one spinneret 12 in electrical communication with a power source 14 and a grounded collector 16, spaced from the at least one spinneret 12, which may also be in electrical communication with the power source 14.

The at least one spinneret 12 is in fluid communication with a reservoir 18 containing a polymeric precursor 20. In some embodiments, a pump 22 may be provided in fluid communication between the at least one spinneret 12 and the reservoir 18 to convey the polymeric precursor 20 from the reservoir 18 to the at least one spinneret 12. Various configurations of the at least one spinneret 12 may be used depending on the type of electrospinning (e.g., melt, solution, or wire electrospinning). For example, in some embodiments, the at least one spinneret 12 can include a single syringe needle, a multi-syringe needle, an extrusion die, or porous media. In some other embodiments, the at least one spinneret 12 may include various shapes upon which the polymeric precursor 20 may form a film, for example, a cone-like, edge-like, wire, cylinder, knife edge, or spiral coil shape. The power source 14 applies a direct current (DC) voltage to the at least one spinneret 12 thereby biasing the at least one spinneret 12 at a first DC voltage (e.g., a positive or negative DC voltage). The at least one spinneret 12 is disposed at a first end 24A of a polymeric precursor flowpath 24 while the collector 14 is disposed at an opposing second end 24B of the flowpath 24. The at least one spinneret 12 is configured to dispense (i.e., extrude) the polymeric precursor 20 into the flowpath 24 extending between the at least one spinneret 12 and the collector 16. In some embodiments, the collector 16 and the at least one spinneret 12 are configured to move relative to one another. For example, the at least one spinneret 12 may be configured to move in one or more of an x-, a y-, or a z-direction. For further example, the collector may be configured to move in one or more of the x-, the y-, or the z-direction, and/or rotate and/or tilt about an axis.

As noted above, the collector 16 is grounded, thereby biasing the collector 16 at a second DC voltage, different than the first DC voltage of the at least one spinneret 12. The collector 16 is configured to receive the polymeric precursor 20 dispensed by the at least one spinneret 12. The first DC voltage of the at least one spinneret 12 and the second DC voltage of the collector 16 create an electrical potential between the at least one spinneret 12 and the collector 16. As a result of the electrical potential, the polymeric precursor 20 becomes charged causing the polymeric precursor 20 to repel from the at least one spinneret 12 into the flowpath 24, thereby forming a conical shape commonly referred to as a "Taylor Cone." As the polymeric precursor 20 moves along the flowpath 24 between the at least one spinneret 12 and the collector 16, the polymeric precursor 20 begins to elongate and whip randomly (see, e.g., FIG. 1) forming a plurality of "green" nanofibers 26 which are received by (i.e., deposited on) the collector 16. As used herein, the term "green" refers to the condition of the plurality of nanofibers 26 prior to a pyrolysis step. In some embodiments, the fibers disclosed herein (e.g., the plurality of nanofibers 26) may have a diameter of 100 nanometers (nm) to 25 micrometers (μm). In some other embodiments, the fibers disclosed herein may have a diameter of 100 nm to 1 μm. It should be noted that the term "nanofibers" will be used to refer to fibers herein without regard to the diameter of the fibers.

The plurality of nanofibers 26 are deposited on the collector 16 layer by layer to form a three-dimensional green nanofiber structure. As used herein, the term "three-dimensional" is used to convey that the plurality of nanofibers 26 are deposited in multiple layers, for example, on the collector 16. The term "two-dimensional" may be used to refer to a single layer of plurality of nanofibers 26. In some embodiments, the plurality of nanofibers 26, for example, may define a layer wherein a majority of the nanofibers of the layer are in contact with a preceding base layer. For example, a first layer of the plurality of nanofibers 26 may include a first portion of the plurality of nanofibers 26 wherein a majority of the nanofibers of the first portion are in contact with the collector 16. For further example, a second layer of the plurality of nanofibers 26 may include a second portion of the plurality of nanofibers 26 wherein a majority of the nanofibers of the second portion are in contact with the first layer of the plurality of nanofibers 26. In some embodiments, less than a majority of the nanofibers of a layer may be in contact with the preceding base layer.

A thickness of a layer may be any suitable thickness for forming a composite structure. Further, a layer of nanofibers used to form a composite structure may have a thickness which is different than another layer of nanofibers used to form the composite structure.

As will be discussed in further detail, the polymeric precursor may include one or more quantities of resins or polymers, reactants, and/or solvents. In some embodiments, oxidation resistance of the composite structure may be improved by doping the composite material with an ultra-high temperature ceramic such as a refractory carbide or boride. Thus, the polymeric precursor 20 may include one or more quantities of reactants which may form the UHT ceramic material following a pyrolysis and/or a carbothermal or borothermal reduction step. For example, the polymeric precursor 20 may include: a quantity of zirconium oxychloride, a quantity of boric acid to form zirconium diboride ($ZrB_2$), a quantity of polycarbosilane to form silicon carbide (SiC), a quantity of polysilazane, a quantity of tetrakis (diethylamido) hafnium, and a quantity of borane dimethyl sulfide to form SiHfBCN, a quantity of zirconium oxychloride octahydrate, a quantity of ethyl acetoacetate, and a quantity of boric acid to form zirconium diboride (ZrB2), a quantity of zirconium tetrakis (2, 4-pentanedionate) to form zirconium carbide (ZrC), a quantity of polyzirconooxane to form zirconium carbide (ZrC), a quantity of hafnium chloride, a quantity of trimethylamine, a quantity of allyl acetonitrile, a quantity of ethylenediamine, and a quantity of allylamine to form hafnium carbide (HfC), a quantity of zirconium oxychloride octahydrate, a quantity of chitosan or phenolic resin, and a quantity of boric acid to form zirconium diboride (ZrB2), a quantity of hafnium oxychloride octahydrate, a quantity of chitosan or phenolic resin, and a quantity of boric acid to form hafnium diboride (HfB2), a quantity of zirconium oxychloride octahydrate, a quantity of hafnium oxychloride octahydrate, a quantity of chitosan or phenolic resin, and a quantity of boric acid to form Hf0.5Zr0.5B2, a quantity of dialkenyl substituted hafnocene monomers to form hafnium carbide, a quantity of hafnium chloride, a quantity of boric acid, and a quantity of acetylacetone to form hafnium diboride, a quantity of zirconium chloride, a quantity of hafnium chloride, a quantity of boric acid, and a quantity of acetylacetone to form Hf0.5Zr0.5B2, a quantity of polyzirconoxanesal, a quantity of phenylacetate-terminated polysilane, and a quantity of bisphenol-A typebenzoxazine to form zirconium carbide (ZrC)-silicon carbide (SiC), a quantity of bis(cyclopentadienyl) zirconium dihydride, a quantity of boran-dimethyl sulfide, and a quantity of vinyltrimethylsilane to form zirconium diboride, a quantity of polyzirconoxane and a quantity of polycarbosilane to form zirconium carbide (ZrC)-silicon carbide (SiC), a quantity of boron trichloride, a quantity of trichlorosilane, and a quantity of hexamethyldisilazane to form SiBN, a quantity of zirconium tetrachloride, a quantity of acetylacetone, a quantity of hydroquinone or [Zr(acac)2(C4H8O)2]n with polyborazine to form zirconium carbide (ZrC), zirconium diboride (ZrB2), and silicon carbide (SiC), or a quantity of hafnium tetrachloride, a quantity of boric acid, and a quantity of phenolic resin to form Hf0.5Zr0.5B2. The polymeric precursor 20 may include one or more thermoplastic resins or polymers. In some embodiments, the polymeric precursor may include resins or polymers such as, but not limited to, polyacrylonitrile (PAN) resin, phenolic resin, polyvinylpyrrolidone, polyamide, poly(lactic-co-glycolic) acid, polycaprolactone, polypropylene, polivinylalcohol, and nylon-6. The polymeric precursor 20 may include one or more solvents such as, but not limited to, ethanol, xylene, N-dimethylformamide, N-methyl-2-pyrrolidone, N-dimethylacetamide, terahydrofuran, ethanol, 2,4 pentanedione, and water. In some embodiments, more than one polymeric precursor 20 may be used, for example, a first polymeric precursor 20A and a second polymeric precursor 20B which is different than the first polymeric precursor 20A.

In some embodiments, alignment of the plurality of nanofibers 26 during deposition on the collector 16 may be desirable to reduce the porosity of the three-dimensional green structure thereby increasing the density of the final composite structure. Alignment between plurality of nanofibers 26 may be quantified, for example, by evaluating scanning electron microscopy (SEM) images of the nanofiber microstructure to determine an alignment percentage. See, e.g., Rahmani et al., *Statistical Analysis of Nanofibers Alignment in Magnetic-Field-Assisted Electrospinning Including an Alignment Percentage Formula*, J. Appl. Polym. Sci., DOI: 10.1002/APP.41179 (2014) (incorporated herein by reference).

In some embodiments, the electrospinning system 10 may include a plurality of magnets 28 disposed about and radially spaced from the flowpath 24 between the at least one spinneret 12 and the collector 16. In some embodiments, the plurality of magnets 28 may be circumferentially spaced from one another about the flowpath 24. The plurality of magnets 28 form a first magnetic field which extends into the flowpath 24. Whipping of the plurality of nanofibers 26 as they move between the at least one spinneret 12 and the collector 16 generates a second magnetic field in the plurality of nanofibers 26 which interacts with the first magnetic field. Interaction between the first and second magnetic fields may change a direction of movement of the plurality of nanofibers 26 along the flowpath 24. Accordingly, the plurality of magnets 28 may be configured to adjust the first magnetic field so as to control the direction of movement of the plurality of nanofibers 26 along the flowpath 24 between the at least one spinneret 12 and the collector 16, thereby improving alignment, and hence density, of the plurality of nanofibers 26 deposited on the collector 16. The plurality of magnets 28 may include electromagnets, permanent magnets, or any other suitable magnet for providing the first magnetic field. In some embodiments, the plurality of magnets 28 may be moved relative to the flowpath 24 in order to control the direction of movement of the plurality of nanofibers 26 along the flowpath 24. In some embodiments, a fiber alignment percentage of the plurality of nanofibers 26 in the range of 50% to 100% may be achieved. In some other embodiments, a fiber alignment percentage of the plurality of nanofibers 26 in the range of 70% to 100% may be achieved. Perfectly aligned and ordered nanofibers may achieve a maximum density of about 78.5% to about 90.7%.

Figure 1A:
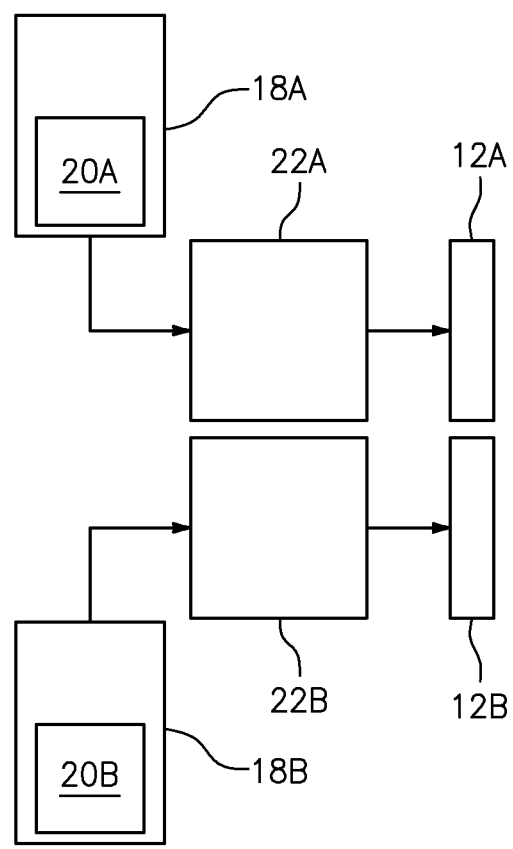
FIG. 1A illustrates a portion of an exemplary embodiment of an electrospinning apparatus.

Referring to FIG. 1A, in some embodiments, the at least one spinneret 12 may include a plurality of spinnerets, for example, a first spinneret 12A and a second spinneret 12B. The first spinneret 12A may be configured to dispense the first polymeric precursor 20A while the second spinneret 12B may be configured to dispense the second polymeric precursor 20B. The first and second spinnerets 12A, 12B may be configured to dispense the first and second polymeric precursors 20A, 20B into the flowpath 24. Accordingly, the collector 16 may be configured to receive the first and second polymeric precursors 20A, 20B from the first and second spinnerets 12A, 12B, respectively. In some embodiments, each of the first and second spinnerets 12A, 12B may have a corresponding reservoir 18A, 18B and pump 22A, 22B. Thus, the nanofiber 26 structure disposed on the collector 16 may be formed from both the first and second polymeric precursors 20A, 20B.

Figure 1B:
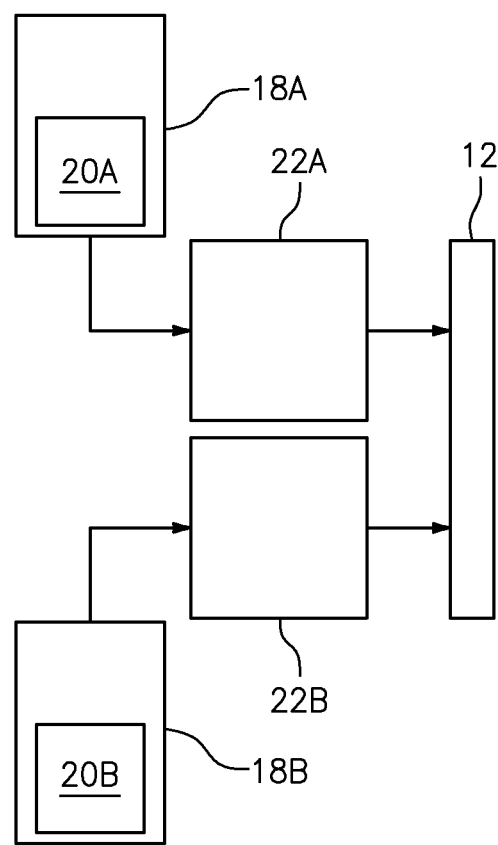
FIG. 1B illustrates a portion of an exemplary embodiment of an electrospinning apparatus.

Referring to FIG. 1B, in some embodiments, the at least one spinneret 12 may be in fluid communication with two or more reservoirs, for example, the first and second reservoirs 18A, 18B via, for example, the first and second pumps 22A, 22B. Accordingly, the at least one spinneret 12 may be configured to form nanofibers 26 having a coaxial configuration. The at least one spinneret 12 may include an inner needle and an outer needle configured to dispense the first polymeric precursor 20A and the second polymeric precursor 20B, respectively. The at least one spinneret 12 may inject a first polymeric precursor 20A into a second polymeric precursor 20B (i.e., from the first and second reservoirs 18A, 18B, respectively) so as to coaxially dispense the first and second polymeric precursors 20A, 20B (e.g., simultaneously). Thus, if the first and second polymeric precursors 20A, 20B are immiscible (i.e., not forming a homogeneous mixture when added together), the at least one spinneret 12 may form the plurality of nanofibers 26 with an interior core made from the first polymeric precursor 20A and an exterior shell made from the second polymeric precursor 20B.

In some embodiments, the electrospinning system 10 may include a rapid thermal processing assembly 30 configured to rapidly perform pyrolysis (e.g., in less than 5 minutes) of a single layer or of multiple layers of the plurality of nanofibers 26 deposited on the collector 16. For example, the at least one spinneret 12 may deposit one or more layers of plurality of nanofibers 26 on the collector, the rapid thermal processing assembly 30 may pyrolyze the plurality of nanofibers 26, and the at least one spinneret 12 may again deposit one or more layers of plurality of nanofibers 26 on the collector 16 until formation of the composite structure is substantially complete. By sequentially performing rapid thermal processing cycles and nanofiber deposition cycles, density of the composite structure may be increased. In some embodiments, the rapid thermal processing assembly 30 may include an infrared furnace or flash pyrolysis assembly into which the collector 16 and deposited plurality of nanofibers 26 are deposited. In some other embodiments, the rapid thermal processing assembly 30 may include one or more thermal energy sources such as, but not limited to, lamps, lasers, electron beams, infrared energy sources, etc., configured to pyrolyze the one or more green nanofiber layers of the plurality of nanofibers 26 deposited on the collector 16 by applying a thermal energy 30H to the plurality of nanofibers 26. In some embodiments, the thermal energy sources of the rapid thermal processing assembly 30 may alternatively or additional be used to apply a thermal energy to a nozzle of the at least one spinneret 12 while the polymeric precursor 20 is being dispensed. As a result, for example, during melt electrospinning, the polymeric precursor 20 may be heated as it leaves the at least one spinneret 12 causing the resulting plurality of nanofibers 26 to remain molten for a greater duration of time, thereby permitting the formation of smaller diameter nanofibers.

The electrospinning system 10 may include at least one controller 32 configured to permit an operator to control operation of the electrospinning system 10. The at least one controller 32 may be in communication (e.g., signal communication) with one or more of the at least one spinneret 12, the power source 14, the reservoir 18, the pump 22, the plurality of magnets 28, the rapid thermal processing assembly 30, and other aspects of the electrospinning system 10. The at least one controller 32 may include any type of computing device, computational circuit, or any type of process or processing circuit capable of executing a series of instructions that are stored in memory. The controller 32 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling one or more structures of the electrospinning system 10, and the stored instructions are not limited to any particular form (e.g., program files, system data, buffers, drivers, utilities, system programs, etc.) provided they can be executed by the at least one controller 32. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the at least one controller 32 may be achieved via the use of hardware, software, firmware, or any combination thereof. The at least one controller 32 may also include input (e.g., a keyboard, a touch screen, etc.) and output devices (a monitor, sensor readouts, data ports, etc.) that enable the operator to input instructions, receive data, etc.

Figure 2:
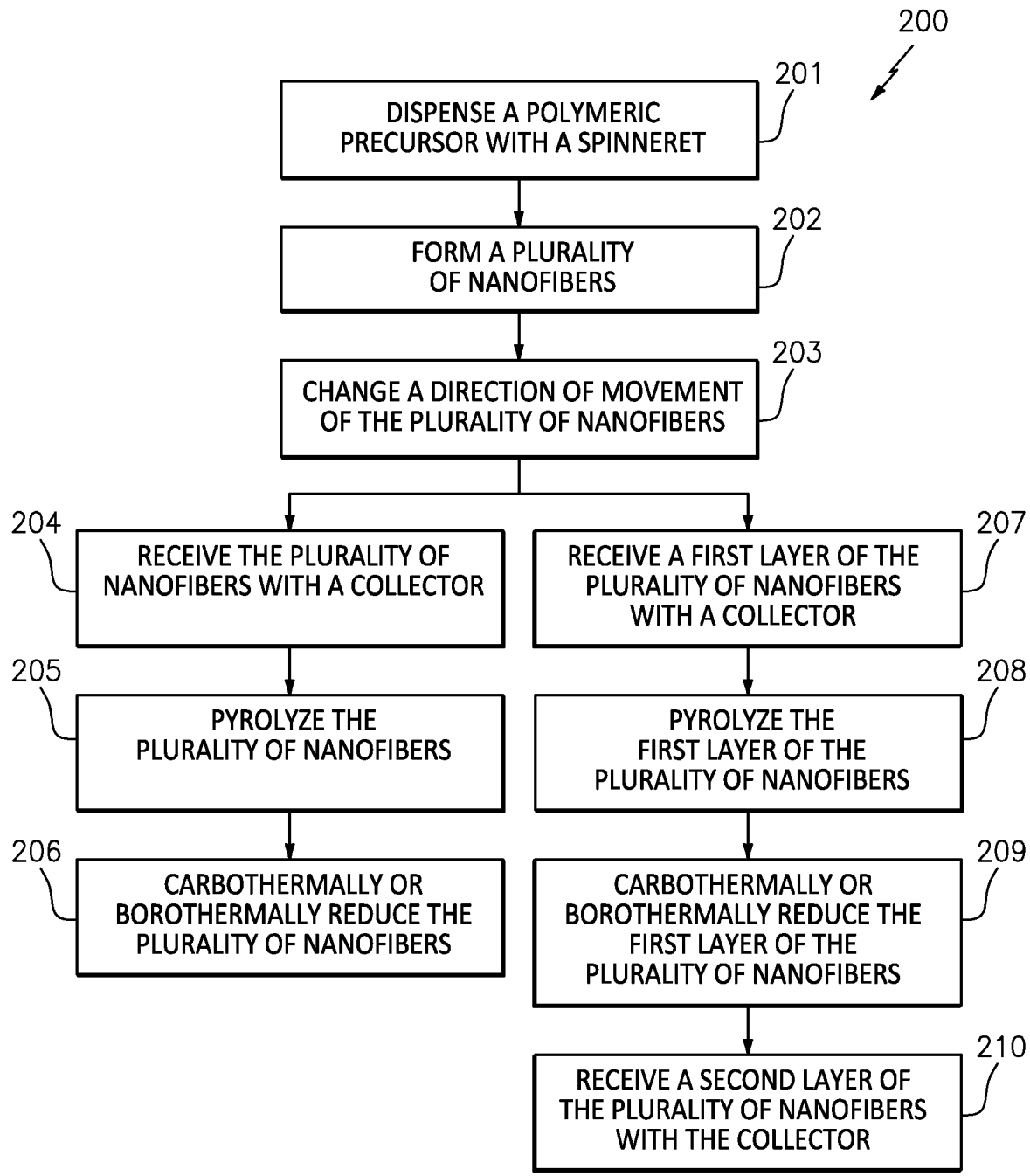
FIG. 2 is a flowchart depicting a method for forming a UHT composite structure.

Referring to FIG. 2, a method 200 for forming a three-dimensional composite structure according to one or more embodiments of the present disclose is provided. In step 201, the polymeric precursor 20 is dispensed with the at least one spinneret 12 into the flowpath 24. In step 202, the plurality of nanofibers 26 are formed by whipping action of the polymeric precursor 20 as it moves along the flowpath 24 from the at least one spinneret 12 to the collector 16. In step 203, the direction of movement of the plurality of nanofibers 26 along the flowpath 24 is changed by adjusting the magnetic field of the plurality of magnets 28 in order to align the plurality of nanofibers 26 on the collector 16. In step 204, the plurality of nanofibers 26 are received by the collector 16. In step 205, the plurality of nanofibers 26 are pyrolyzed. In some embodiments, the pyrolysis step may apply a thermal energy 30H up to about 850° C. (1562° F.) to the plurality of nanofibers 26 disposed on the collector 16. In step 206, the plurality of nanofibers 26 is carbothermally or borothermally reduced. In some embodiments, the temperature range of the carbothermal or borothermal reduction for the plurality of nanofibers 26 disposed on the collector 16 may be in the range of about 1200° C. to about 2000° C. (about 2192° F. to about 3632° F.). In some other embodiments, the temperature range of carbothermal or borothermal reduction for the plurality of nanofibers 26 disposed on the collector 16 may be in the range of about 1200° C. to about 1600° C. (about 2192° F. to about 2912° F.).

Alternatively to step 204-206, in step 207, a first at least one layer of the plurality of nanofibers 26 is received by the collector 16. In step 208, the first at least one layer of the plurality of nanofibers 26 is pyrolyzed, as discussed above. In some embodiments, pyrolysis of the plurality of nanofibers may be accomplished by rapid thermal processing.

Rapid thermal processing of the plurality of nanofibers 26 may include applying a thermal energy 30H to the first at least one layer of the plurality of nanofibers 26 with the rapid thermal processing assembly 30. In step 209, the first at least one layer of the plurality of nanofibers 26 is carbothermally or borothermally reduced. Following the carbothermal or borothermal reduction of step 209, in step 210, a second at least one layer of the plurality of nanofibers is received by the collector 16. Steps 208-210 may be repeated until the composite structure is complete.

Green nanofibers deposited on collector 16 may be poor conductors of electricity while the composite material formed on the collector 16 from the green nanofibers (e.g., following pyrolysis and carbothermal/borothermal reduction) may have substantially improved electrical conduction properties. As a result, the composite material may provide an improved electrical conducting path between the exterior surface of the material disposed on the collector 16 (which may be green nanofibers or composite material) and the collector 16 itself. Without a sufficient electrical conducting path, the green nanofibers deposited on the collector 16 may cause an electrical charge to build up causing the electrical potential between the at least one spinneret 12 and the exterior of the material deposited on the collector 16 to decrease. As a result, nanofibers formed by the at least one spinneret 12 may be repelled from the collector 16. Accordingly, one or more embodiments of the present disclosure may permit improved formation of composite structures by providing a sufficient conducting path between the formed nanofibers and the composite structure and to provide continuous deposition of nanofibers on the collector 16.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A method for forming an ultra-high temperature (UHT) composite structure, the method comprising:
    dispensing a polymeric precursor with a spinneret biased at a first DC voltage;
    forming a plurality of nanofibers from the polymeric precursor;
    receiving a first layer of the plurality of nanofibers with a collector biased at a second DC voltage different than the first DC voltage;
    changing a direction of movement of the plurality of nanofibers between the spinneret and the collector with a plurality of magnets having a magnetic field by adjusting the magnetic field;
    pyrolyzing the first layer of the plurality of nanofibers disposed on the collector;
    carbothermally or borothermally reducing the first layer of the plurality of nanofibers disposed on the collector; and
    receiving a second layer of the plurality of nanofibers with the collector, such that the second layer of the plurality of nanofibers is in contact with the first layer of the plurality of nanofibers, subsequent to pyrolyzing and carbothermally or borothermally reducing the first layer of the plurality of nanofibers.

2. The method of claim 1, wherein each magnet of the plurality of magnets is an electromagnet.

3. The method of claim 1, further comprising pyrolyzing the first layer of the plurality of nanofibers disposed on the collector with a rapid thermal processing assembly.

4. The method of claim 3, wherein the rapid thermal processing assembly includes at least one of a laser, an electron beam, or a flash pyrolysis assembly.

5. The method of claim 1, wherein pyrolyzing the first layer of the plurality of nanofibers includes applying a thermal energy to the first layer of the plurality of nanofibers deposited on the collector.

6. A method for forming an ultra-high temperature (UHT) composite structure, the method comprising:
    dispensing a polymeric precursor with a spinneret biased at a first DC voltage;
    forming a plurality of nanofibers from the polymeric precursor;
    receiving a first layer of the plurality of nanofibers with a collector biased at a second DC voltage different than the first DC voltage;
    pyrolyzing the first layer of the plurality of nanofibers deposited on the collector with a rapid thermal processing assembly by applying a thermal energy to the first layer of the plurality of nanofibers; and
    carbothermally or borothermally reducing the first layer of the plurality of nanofibers deposited on the collector subsequent to pyrolyzing the first layer of the plurality of nanofibers.

7. The method of claim 6, further comprising changing a direction of movement of the plurality of nanofibers between the spinneret and the collector with a plurality of magnets.

8. The method of claim 6, further comprising:
    receiving a second layer of the plurality of nanofibers with the collector subsequent to pyrolyzing the first layer of the plurality of nanofibers.

9. The method of claim 1, further comprising:
    dispensing a second polymeric precursor, different than the polymeric precursor, with a second spinneret biased at a third DC voltage different than the second DC voltage; and
    forming a second plurality of nanofibers from the second polymeric precursor;
    wherein the first layer further includes nanofibers of the second plurality of nanofibers.

* * * * *